(12) United States Patent
Tuymer

(10) Patent No.: US 7,506,662 B2
(45) Date of Patent: Mar. 24, 2009

(54) ONE-WAY FLUID VALVE

(76) Inventor: Walter Tuymer, 9285 NW. 16th St., Coral Springs, FL (US) 33065

( * ) Notice: Subject to any disclaimer, the term of this patent is extended or adjusted under 35 U.S.C. 154(b) by 364 days.

(21) Appl. No.: 11/528,944

(22) Filed: Sep. 28, 2006

(65) Prior Publication Data

US 2007/0074768 A1 Apr. 5, 2007

Related U.S. Application Data

(60) Provisional application No. 60/722,656, filed on Sep. 30, 2005.

(51) Int. Cl.
*G05D 7/01* (2006.01)

(52) U.S. Cl. .............. 137/496; 137/500; 137/506; 137/601.05; 137/601.13; 137/601.15; 251/58; 251/250

(58) Field of Classification Search ............... 137/496, 137/500, 506, 601.05, 601.13, 595, 503, 137/494, 601.15; 251/58, 250
See application file for complete search history.

(56) References Cited

U.S. PATENT DOCUMENTS

| | | | |
|---|---|---|---|
| 654,009 A * | 7/1900 | Kittenger et al. ............ | 137/465 |
| 875,277 A * | 12/1907 | Meyer ........................ | 417/508 |
| 1,958,262 A * | 5/1934 | Boland ........................ | 137/496 |
| 2,988,885 A | 6/1961 | Schnaible | |
| 3,650,506 A * | 3/1972 | Bruton ........................ | 251/58 |
| 3,786,834 A | 1/1974 | Garland | |
| 3,829,253 A | 8/1974 | Bunn et al. | |
| 4,036,251 A | 7/1977 | Hartwick et al. | |
| 5,494,254 A * | 2/1996 | Dominka ..................... | 251/58 |
| 6,012,483 A | 1/2000 | Beddies et al. | |
| 2002/0144733 A1 | 10/2002 | Artner | |

* cited by examiner

*Primary Examiner*—Stephen M Hepperle
(74) *Attorney, Agent, or Firm*—Darby & Darby PC; Robert J. Sacco

(57) ABSTRACT

An improved one-way fluid valve construction is provided. A valve housing (102) includes one or more valve ports (108) and control ports (110). A control member (304) is disposed within the control port (110). The control member (304) is movable within the control port (110) between a first position and a second position. A control rod (302) can extend between the control member (304) and a portion of the valve port (108). A control rod coupling (402) interacts with the control member (304) to cause a rotational or pivotal movement the control rod (302) through a predetermined angular arc in response to movement of the control member (304). A sealing face (404) formed on a second portion of the control rod (302) advantageously forms a seal with an orifice (316) that separates an input side of the valve port (108) from an output side. The seal can be formed when the control rod (302) is in a control rod sealed position. When the control rod (302) is rotated to a control rod unsealed position, the sealing face unseals from the orifice (316).

26 Claims, 6 Drawing Sheets

Fig. 3A
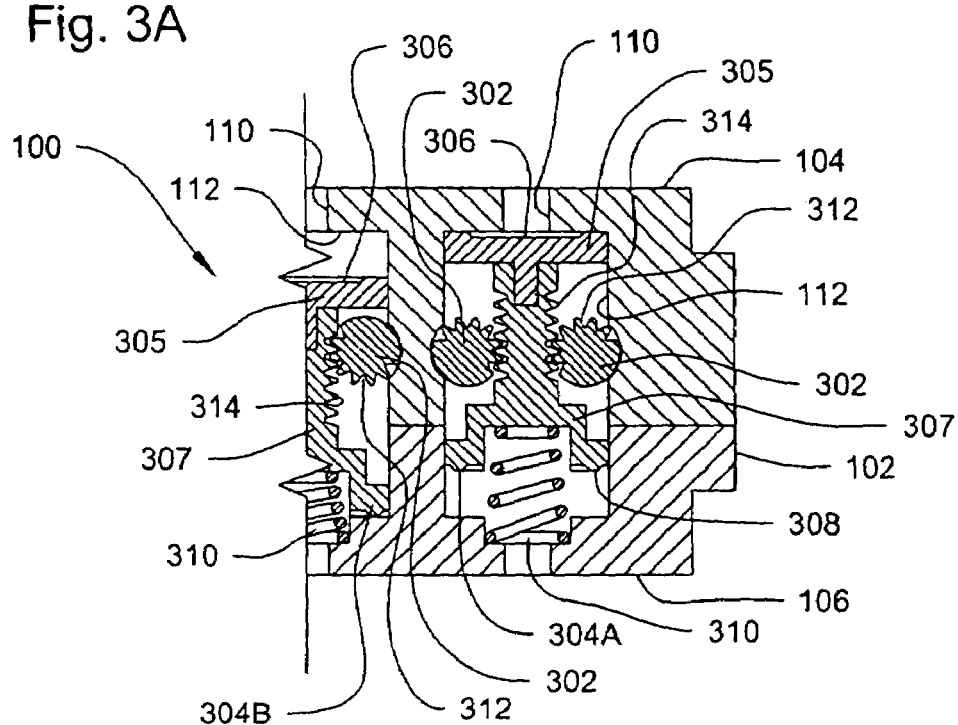
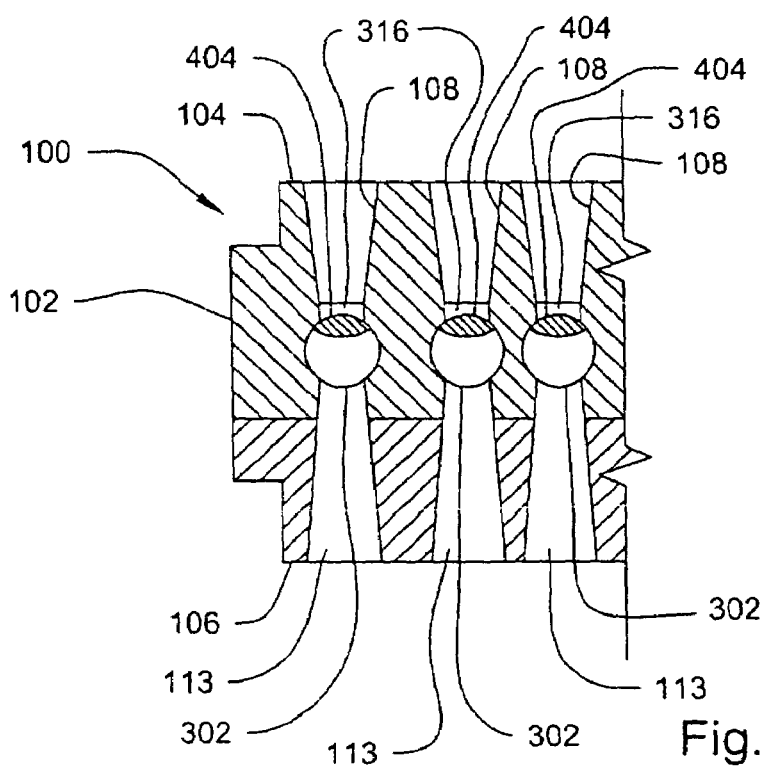
Fig. 3B

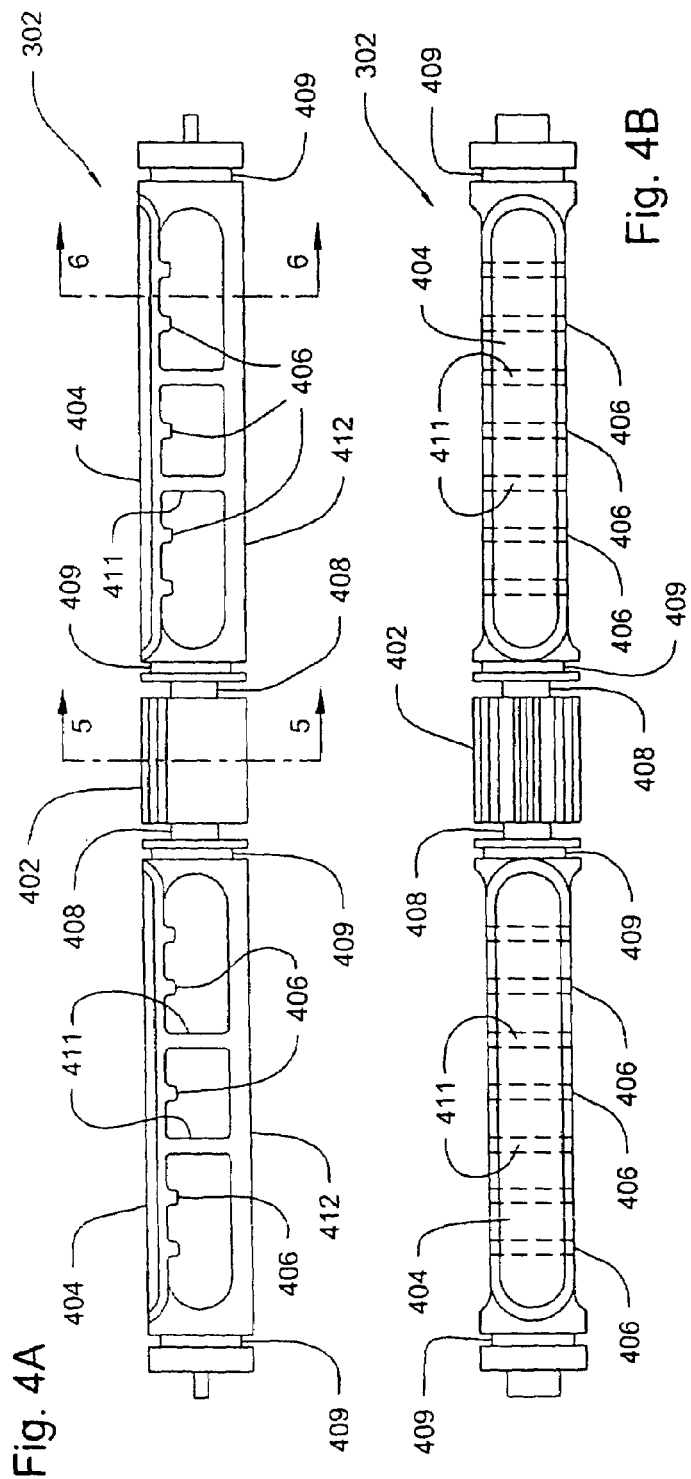

ONE-WAY FLUID VALVE

CROSS REFERENCES TO RELATED APPLICATIONS

This application claims benefit of U.S. provisional patent application Ser. No. 60/722,656, filed Sep. 30, 2005, which is herein incorporated by reference.

BACKGROUND OF THE INVENTION

1. Statement of the Technical Field

The invention relates generally to check valves, and more particularly to an improved straight flow one-way valve for use as an intake or discharge (or delivery) valve in fluid compressors.

2. Description of the Related Art

Fluid compressors are used in a wide variety of industrial and commercial applications. Some types of fluid compressor, such as reciprocating piston systems, typically require the use of some type of valve to control a flow of air. One type of valve that is commonly used in fluid compressors is called a check valve. Check valves generally allow a fluid, such as air, to pass in a first direction, but do not allow fluid to flow in an opposite direction. For example, such valves are often positioned so that a first valve allows fluid to flow into a cylinder of a reciprocating piston compressor during an intake stroke. A second valve is typically positioned for allowing fluid to flow out of the cylinder during a compression stroke.

A variety of different check valve designs have been proposed over the years. For example, U.S. Pat. No. 4,036,251 to Hartwick et al. discloses such a check valve. Still, there are a number of key design criteria for check valves that are subject to improvement. One design goal is increasing the equivalent orifice size of the check valve. Equivalent orifice is a term that compares the resistance that a fluid encounters passing through a valve opening to the resistance of a circular opening in a thin plate through which the same quantity of fluid flows under the same pressure. Another design goal is to improve reliability and longevity of the valve. Yet another design goal is to improve the manufacturability of high flow check valves.

SUMMARY OF THE INVENTION

The invention concerns an improved one-way fluid valve construction. The one way fluid valve construction is formed from a valve housing that includes at least one valve port and at least one control port. Each of the valve port and the control port define a hollow passage extending from an inlet face of the valve housing to an outlet face of the valve housing.

A control member is disposed within the control port. The control member can have first and second faces. A first face can be in fluid communication with the inlet face of the valve housing and a second face can be in fluid communication with the outlet face of the valve housing. The control member is advantageously arranged so that it is movable within the control port between a first position and a second position. A resilient member is provided that can bias the control member toward the first position. The control member can transition from the first position to a second position upon the occurrence of a predetermined fluid pressure differential as between the inlet face and the outlet face. For example, the transition can be a linear sliding motion that can occur within the control port.

A control rod is provided that is rotatably journaled within the housing. The control rod can extend between the control member and a portion of the valve port. The control rod advantageously has a coupling at a first portion adjacent to the control member. The coupling can directly or indirectly engage a portion of the control member. Consequently, the control member can cause a rotational or pivotal movement of the control rod through a predetermined angular arc. This rotational movement occurs when the control member transitions between the first position and the second position. In one embodiment of the invention, the coupling comprises a plurality of gear teeth that engage a complementary plurality of gear teeth on control member. In another embodiment of the invention, the coupling comprises a single tooth that engages a notch on the control member.

A sealing face is formed on a second portion of the control rod that extends into the valve port. The sealing face can advantageously form a seal with an orifice that separates an input side of said hollow passage from an output side of the hollow passage. The seal can be formed when the control rod is in a control rod sealed position. When the control rod is rotated to a control rod unsealed position, the sealing face unseals from the orifice.

BRIEF DESCRIPTION OF THE DRAWINGS

FIG. 3A is cross-sectional view of a cutaway portion of the fluid valve in FIG. 1, taken along line 3A-3A.

FIG. 3B is cross-sectional view of a cutaway portion of the fluid valve in FIG. 1, taken along line 3B-3B.

FIG. 4A shows a top view of a control rod that can be used in the fluid valve of FIG. 1.

FIG. 4B shows a side elevation view of the control rod in FIG. 4A.

FIG. 5 shows a cross-sectional view of the control rod in FIG. 4A taken along line 5-5.

FIG. 6 shows a cross-sectional view of the control rod in FIG. 4A taken along line 6-6.

DETAILED DESCRIPTION OF THE PREFERRED EMBODIMENTS

Figure 1:
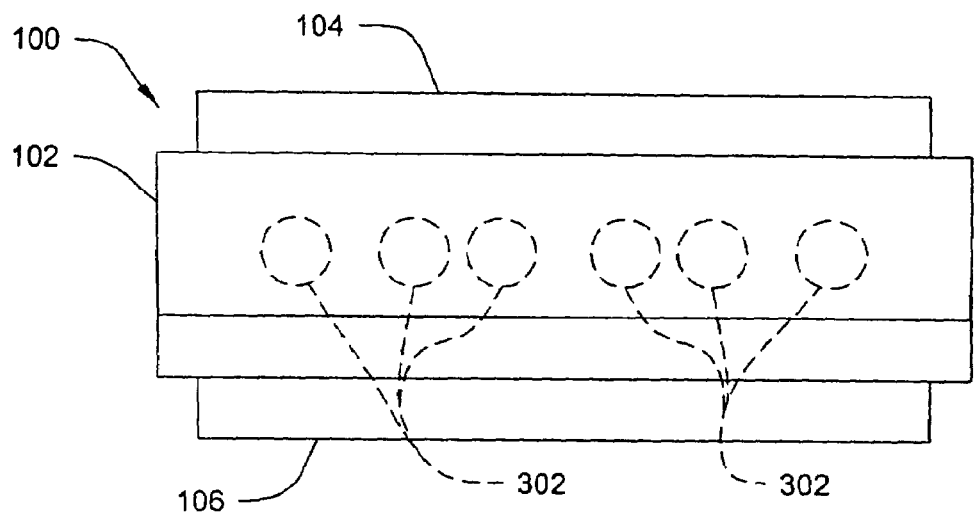
FIG. 1 is a side elevation view of a fluid valve that is useful for understanding the present invention.
Figure 2:
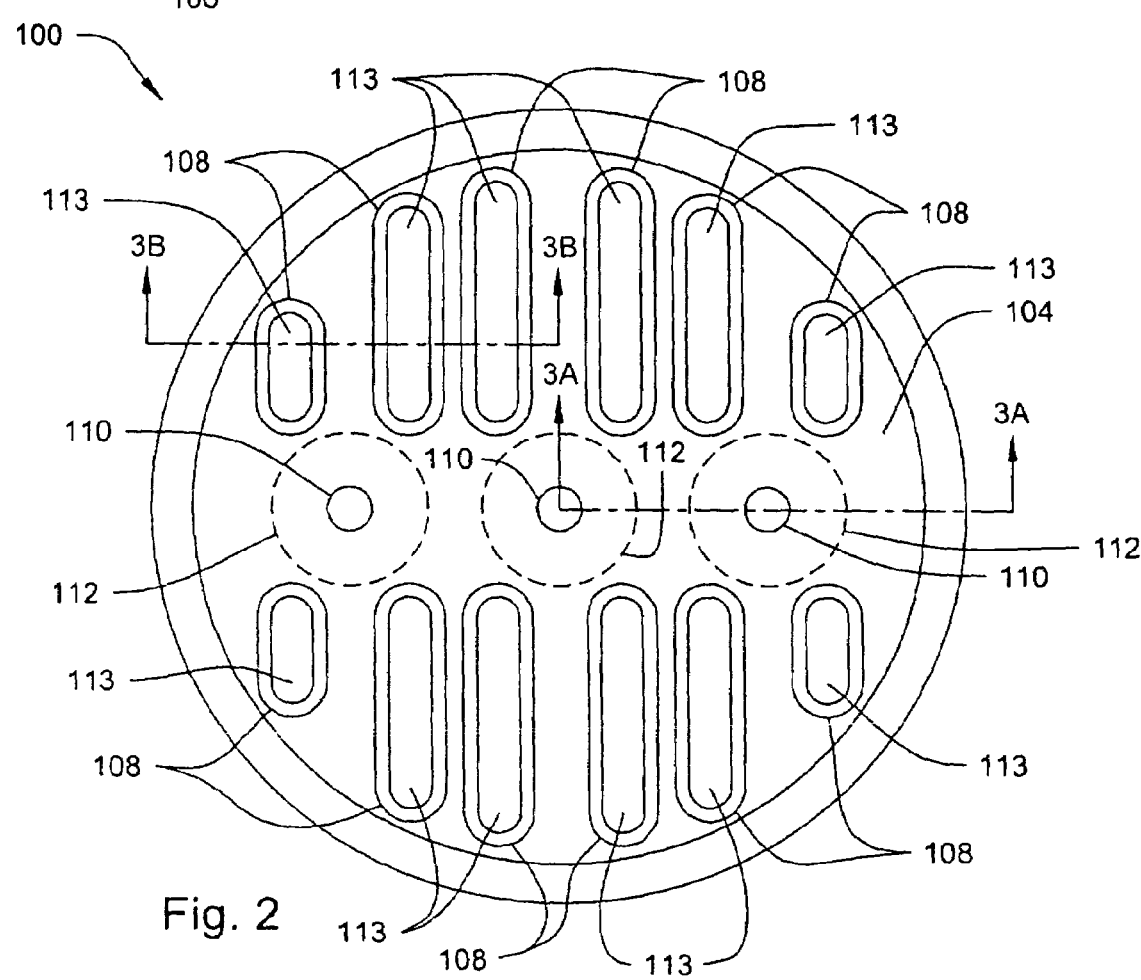
FIG. 2 is a top view of the fluid valve in FIG. 1.

Referring to FIGS. 1 and 2, shown is a one-way fluid valve 100 for use as a fluid intake or check valve for a fluid compressor. In one embodiment of the invention, the valve 100 is designed for use in the intake or delivery side of a fluid compressor, although other uses will be apparent to one of ordinary skill in the art. The valve 100 is formed partially from a valve housing 102. The valve housing 102 is generally formed of metal. However, the invention is not limited in this regard as to the material selected for the valve housing 102.

The valve housing 102 has in inlet face 104 and an outlet face 106. The inlet face 104 and outlet face 106 are disposed on opposing sides of the valve housing 102. The valve housing 102 also includes at least one valve port 108 and at least one control port 110. Each of the valve ports 108 and the control ports 110 define a hollow passage that extends from the inlet face 104 of the valve housing 102 to the outlet face 106 of the valve housing 102. The hollow passage associated with the control ports 110 is a cavity 112. The hollow passage associated with the valve ports 108 is a flow channel 113 (see also FIG. 3B). In the embodiment shown, there is one control port 110 located between opposing pairs of valve ports 108. Each control port 110 is associated with a pair of control rods 302 (best seen in FIG. 3A) which control the flow of intake air into the valve ports 108 and the fluid compressor (not shown). The number of valve ports 108 and control ports 110 are selected according to a desired amount of air flow through valve 100 into the fluid compressor (not shown). For example, in FIG. 1, there are three control ports 110 and twelve valve ports 108. Still, the invention is not limited in this regard.

Referring now to FIGS. 3A and 3B, it can be observed that a control member 304 is disposed within the cavity 112 of each of the control ports 110. The control members 304 can have first and second faces 306, 308. The first face 306 can be in fluid communication with the inlet face 104 of the valve housing 102 and the second face 308 can be in fluid communication with the outlet face 106 of the valve housing. The control member 304 is advantageously arranged so that it is movable within the cavity 112 of control ports 110 between a first position and a second position. For example, in FIG. 3A, one of the control members 304A is shown in a first position, and a second one of the control members 304B is shown in the second position. In FIG. 3A, the control members 304 will generally be in the first position when the fluid pressure on the inlet face 104 is less than the fluid pressure at the outlet face 106 by a predetermined amount.

Note that control members 304 are shown concurrently in different positions in FIG. 3A to facilitate an understanding of the invention. It should be understood that in actual operation of the valve 100, all control members 304 will be generally in the same relative position at any given moment. For example, all of the control members 304 will generally be in the first position when the fluid pressure on the inlet face 104 is less than the fluid pressure at the outlet face 106 by a predetermined amount. Conversely, all of the control members 304 will generally be in the second position when the fluid pressure on the inlet face 104 is greater than the fluid pressure at the outlet face 106 by a predetermined amount.

Each control member 304 is resiliently biased toward the inlet face 104 with a resilient member 310. In one embodiment of the invention, the resilient member 310 is a spring. When the control member 304 is in a first position, fluid is prevented from traveling through flow channel 113 from the inlet face 104 to the outlet face 106. When the fluid pressure exerted on first face 306 exceeds the fluid pressure exerted on second face 308 by an amount corresponding to the biasing force of the resilient member 310, the control member 304 will transition from the first position to the second position. The movement of control member 304 is linear along a path defined by the cavity 112 of the control port 110. The control member 304 slides within the cavity 112 between the first position and the second position, depending upon the pressure differential between the inlet face 104 and the outlet face 106.

Figure 7A:
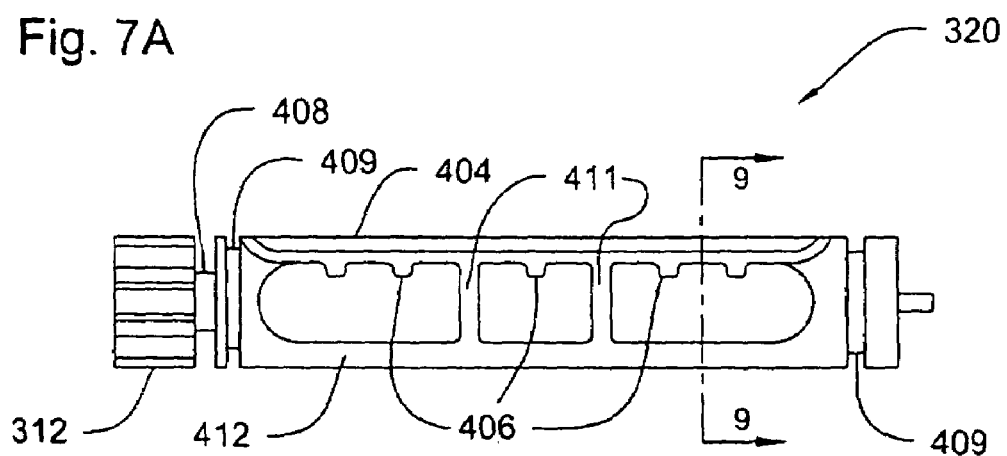
FIG. 7A shows a top view of a section of a control rod that forms part of a control rod construction formed from two control rod sections that can be used in the fluid valve of FIG. 1.
Figure 7B:
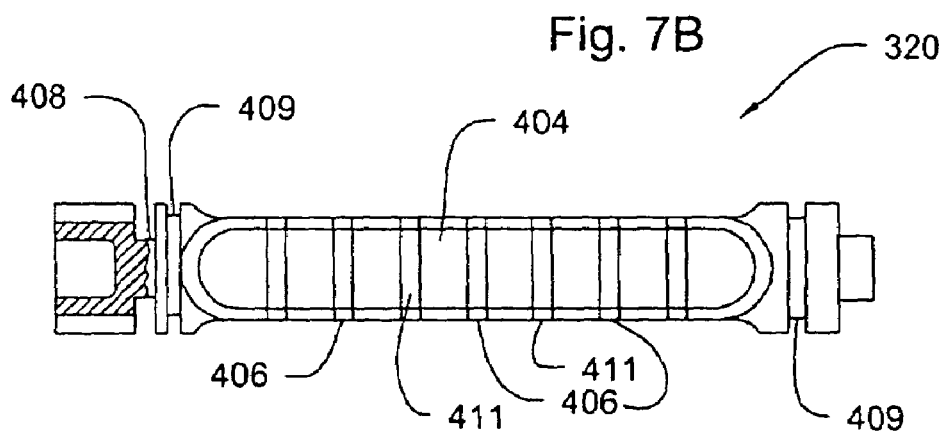
FIG. 7B shows a side view of a section of a control rod that forms part of a control rod construction formed from two of said control rod sections that can be used in the fluid valve of FIG. 1.

At least one control rod 302 is coupled to each of the control members 304. In FIG. 3A, two control rods 302 are coupled to each of the control members 304A and 304B. However, the invention is not limited in this regard. There could be a single control rod 302 coupled with a single control member 304A or 304B (not shown). In any case, the control rods 302 are rotatably journaled within the housing 102 and can extend transversely from one or both sides of the control member 304. More particularly, the control rods 302 can extend to adjacent pairs of valve ports 108 that are disposed on either side of the control ports 110. Further, each control rod 302 can be formed as a single unit or can be formed from two or more sections. For example, the control rod 302 can be bisected along line 5-5 (FIG. 4A). A section 320 of a control rod 302 that could form a control rod 302 is shown in FIGS. 7A-7B. Still, the invention is not limited to any particular construction with respect to the control rod 302.

Referring now to FIGS. 4A and 4B, shown are top and side elevation views, respectively, of the control rod 302. The control rod 302 is comprised of an elongated rod-like member. Two or more annular guide channels 408 can be provided for maintaining the control rod 302 in proper alignment with housing 100 and the various ports 108, 110. The annular guide channels 408 can engage rib portions (not shown) of the control member 304 to prevent lateral movement of the control rod 102. In addition, there are seal channels 409 disposed on each of the opposing ends of the control rod 302. There can be more seal channels 409 disposed adjacent to each of the guide channels 408. The seal channels 409 are for receiving a seal such as an o-ring to prevent the leakage of compressed air from the valve housing 102 (FIG. 1). Control rod 302 also includes at least one sealing face 404 disposed on a portion of the control rod 302. A plurality of ribs 406 can be provided on the control rod 302 for ensuring greater structural rigidity. There is at least one land 412 opposite each of said at least one sealing face 404. The at least one land 412 is connected to said at least one sealing face 404 by at least one bridge 411 for even greater structural rigidity. The sealing face 404 and plurality of ribs 406 are also shown in FIG. 6, which is a cross-sectional view of the control rod 302, taken along line 6-6. Alternately, the control rod 302 be constructed without the at least one land 412 and at least one bridge 411 connecting the at least one land 412 to the at least one sealing face (not shown). This construction of a control rod 302 may be desirable to reduce overall material and manufacturing costs. In addition, the inner seal channel 409 adjacent to guide channel 408 on control rod 302 may be eliminated (not shown) to reduce manufacturing costs and overall complexity.

Figure 3C:
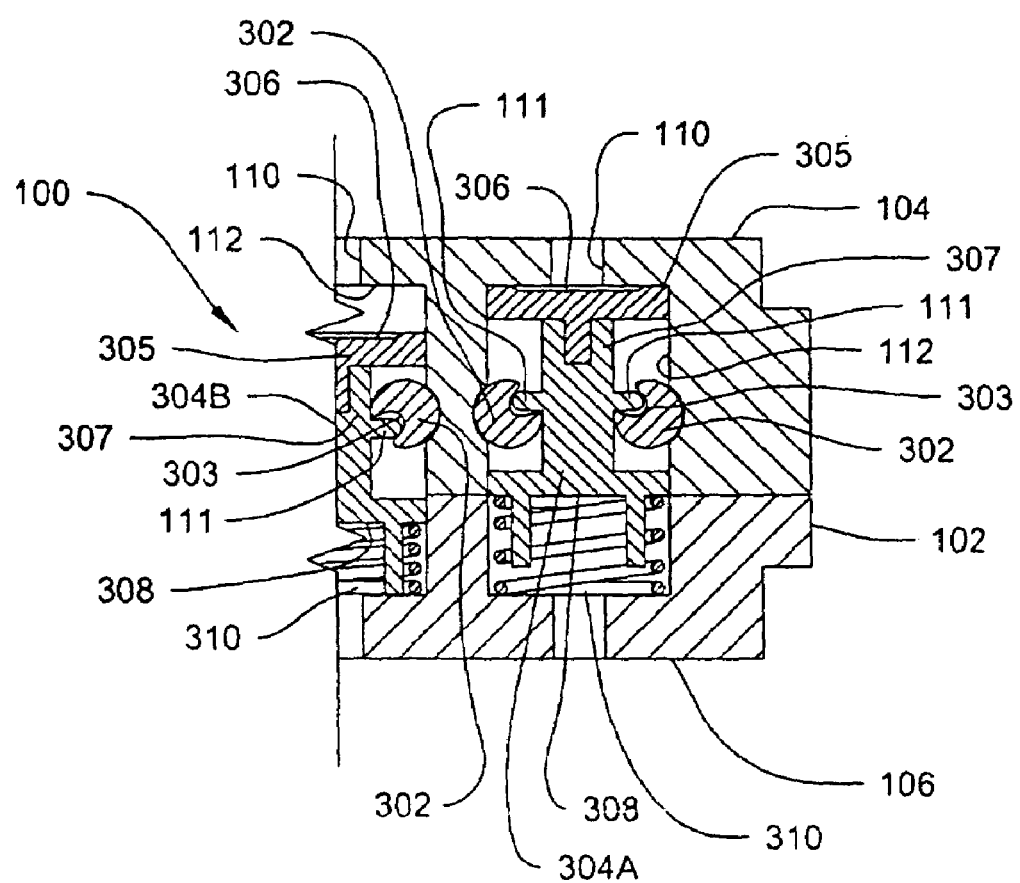
FIG. 3C is another embodiment of the fluid valve of FIG. 1 showing a cross-sectional view of a cutaway portion taken along line 3B-3B to show an alternate coupling arrangement of a control rod and control member.

Referring now also to FIG. 3A, it can be observed that each control rod 302 advantageously has a coupling 402 (FIGS. 4A-4B) at a first portion that is disposed adjacent to a control member 304 when the control rod 302 is positioned within the valve housing 102. The coupling 402 (FIGS. 4A-4B) can directly or indirectly engage a portion of the control member 304. In FIG. 3A, the coupling 402 (FIGS. 4A-4B) is comprised of a plurality of gear teeth 312 that are provided on a surface of the control rod 302. The plurality of gear teeth 312 are shown in FIG. 3A and in FIG. 5, which is a cross-sectional view of the control rod 302 taken along line 5-5. A corresponding plurality of gear teeth 314 are also formed on a shaft of each control member 304. The plurality of gear teeth 312 on control rod 302 engage the plurality of gear teeth 314 on control member 304. Consequently, the movement of control member 304 can cause a rotational or pivotal movement of the control rod 302 through a predetermined angular arc of rotation. This rotational movement occurs when the control member 304 transitions between the first position and the second position. Notwithstanding that the coupling 402 is shown as a plurality of gear teeth 312, it should be understood that the invention is not limited to that specific type of coupling arrangement. In fact, any suitable coupling can be used for this purpose, provided that it is capable of translating the movement of the control member 304 to a rotational movement of the control rod 302 as previously described herein. Another embodiment of a coupling arrangement is shown in FIG. 3C and described in detail hereinbelow.

Referring again to FIG. 3A, and also to FIGS. 3B and 4A-4B, it can be observed that the sealing face 404 of the control rod 302 can extend into the valve port 108 when the control rod is positioned within the housing 102. The sealing face 404 can advantageously form a seal with an orifice 316 formed in each valve port 108. For example, the seal can be formed by engagement of the sealing face 404 and a perimeter of the orifice 316. The seal can provide a fluid barrier that seals an input side of the flow channel 113 defined by the valve port 108 from an output side of the flow channel 113. The seal can be formed when the control rod 302 is in a control rod sealed position. When the control rod 302 is rotated to a control rod unsealed position, the sealing face unseals from the orifice 316. For example, the control rod 302 can be rotated to the control rod sealed position when the control member 304 is in the first position shown by control member 304A. The control rod 302 can be rotated to the control rod unsealed position when the control member 304 is in the second position shown by control member 304B.

Referring to FIG. 3C, another embodiment of a one-way fluid valve 100 for use as a fluid intake or check valve for a fluid compressor is shown. The one-way fluid valve 100 is identical to the one-way fluid valve 100 of the previous embodiment except that there is an alternate coupling arrangement for coupling control member 304 to control rod 302. Specifically, a control member 304 is disposed within a cavity 112 of each of the control ports 110. The control members 304 can have first and second faces 306, 308. The first face 306 can be in fluid communication with the inlet face 104 of the valve housing 102 and the second face 308 can be in fluid communication with the outlet face 106 of the valve housing. The control member 304 is advantageously arranged so that it is movable within the cavity 112 of control ports 110 between a first position and a second position. Each control member 304 is resiliently biased toward the inlet face 104 with a resilient member 310. In one embodiment of the invention, the resilient member 310 is a spring. Each control member 304 can be of a two piece construction comprised of a top cap member 305 and a lower piston member 307 to facilitate assembly in valve body 102.

The alternate coupling arrangement is comprised of a coupling 402 (FIGS. 4A-4B) on control rod 302 which could be comprised of a single tooth 111 that engages a notch or lip 303 that is formed on the control member 302. Consequently, the movement of control member 304 can cause a rotational or pivotal movement of the control rod 302 through a predetermined angular arc of rotation. This rotational movement occurs when the control member 304 transitions between the first position and the second position. In FIG. 3C, one of the control members 304A is shown in a first position, and a second one of the control members 304B is shown in the second position. The control members 304 will generally be in the first position when the fluid pressure on the inlet face 104 is less than the fluid pressure at the outlet face 106 by a predetermined amount. Note that control members 304 are shown concurrently in different positions in FIG. 3C to facilitate an understanding of the invention. It should be understood that in actual operation of the valve 100, all control members 304 will be generally in the same relative position at any given moment.

Figure 3D:
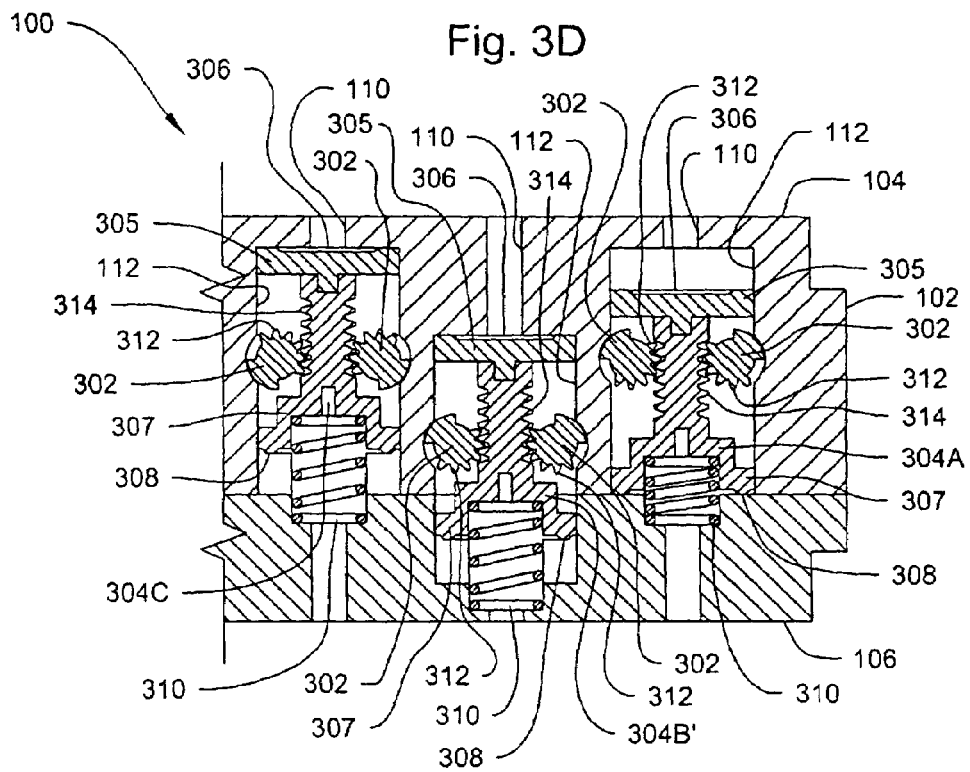
FIG. 3D is another embodiment of the fluid valve of FIG. 1 showing a cross-sectional view of a cutaway portion taken along line 3B-3B to show another embodiment of the control rods arranged in an alternating configuration in the body of the fluid valve.

Referring to FIG. 3D, another embodiment of a one-way fluid valve 100 for use as a fluid intake or check valve for a fluid compressor is shown. The one-way fluid valve 100 is similar to the one-way fluid valve 100 of FIG. 3A except that the control rods 302 are staggered in height between adjacent control ports 110. For example, in FIG. 3D, there is a control member 304C disposed in a control port 110 that is disposed higher in valve body 102 than the adjacent control member 304B and control port 110. Consequently, the control rods 302 disposed adjacent to control member 304C are disposed higher in valve body 102 than the control rods 302 disposed adjacent to control member 304B. Similarly, the control rods 302 disposed adjacent to control member 304A are disposed higher in valve body 102 than the control rods 302 disposed adjacent to control member 304B. The reason for this staggered construction of control rods 302 between adjacent control members 304 is to ensure that there is enough material in valve body 102 between adjacent control rods 302 to ensure the structural integrity of valve body 102 during construction and operation.

In all other respects, the construction of one way fluid valve 100 is identical. For example, each control member 304 is disposed in a hollow passage 112, has a first face in fluid communication with the inlet face 104 of the valve housing 102, and a second face 308 in fluid communication with an outlet face 308. Each control member 304 is resiliently biased toward the inlet face with a resilient member 310. Each control member 304 is coupled to at least two control rods 302 rotatably journaled within the housing 102. Each control member 304 causes a rotational or pivotal movement of the adjacent control rods 302 through a predetermined angular arc of rotation. Each control member 304 can be of a two piece construction comprised of a top cap member 305 and a lower piston member 307 to facilitate assembly in valve body 102.

Figure 3E:
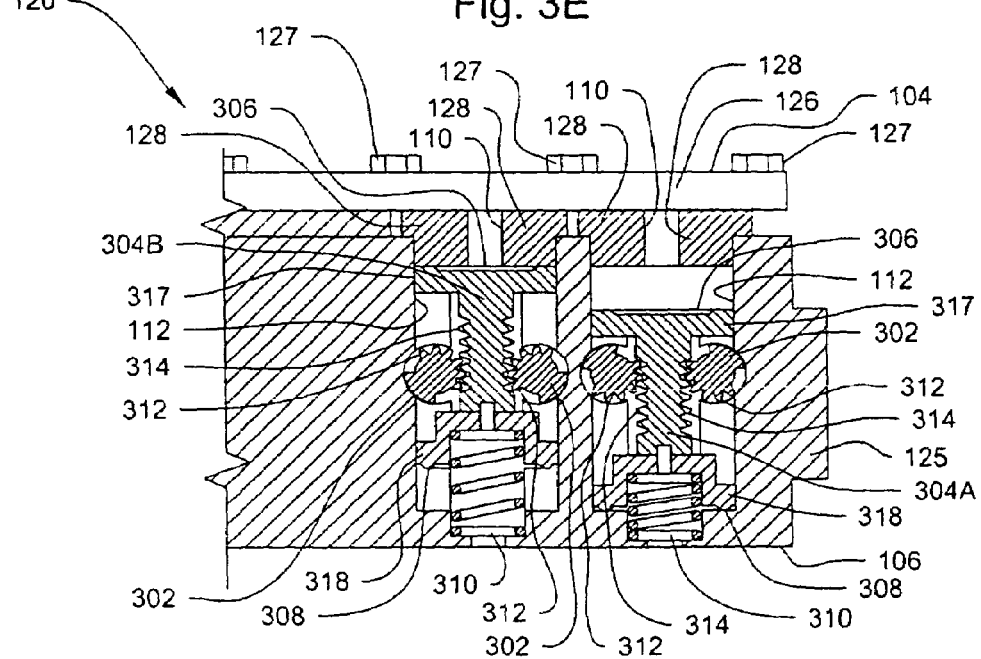
FIG. 3E is another embodiment of the fluid valve of FIG. 1 showing a cross-sectional view of a cutaway portion taken along line 3B-3B to show another embodiment of the construction of body of the fluid valve in a one piece valve body, plugs, and plate construction.

Referring now to FIG. 3E, there is shown yet another embodiment of a one-way fluid valve 120 for use as a fluid intake or check valve for a fluid compressor. The one-way fluid valve 120 is similar to the one-way fluid valve 100 of FIG. 3A except that the valve body 125 is of a one-piece construction and control members 304 are retained within the respective hollow passages 112 by a plate 126 disposed on the top of the valve body 125. At least one plug 128 is inserted between plate 126 and control members 304 for retaining control members 304 in hollow passages 112. One or more retaining members 127 such as bolts can be used to secure plate 126 to valve body 125. Note that control members 304A and 304B are shown concurrently in different positions in FIG. 3E to facilitate an understanding of the invention. It should be understood that in actual operation of the valve 120, control members 304A and 304B will be generally in the same relative position at any given moment.

In all other respects, the construction of one way fluid valve 120 is identical to the one-way fluid valve 100 of FIG. 3A. For example, each control member 304 is disposed in a hollow passage 112, has a first face 306 in fluid communication with the inlet face 104 of the valve housing 103, and a second face 308 in fluid communication with an outlet face 308. Each control member 304 is resiliently biased toward the inlet face with a resilient member 310. Each control member 304 is coupled to two control rods 302 rotatably journaled within the valve housing 103. Each control member 304 causes a rotational or pivotal movement of the adjacent control rods 302 through a predetermined angular arc of rotation. Each control member 304 can be of a two piece construction comprised of an upper piston member 317 and a bottom cap member 318 to facilitate assembly in valve body 125.

Figure 8:
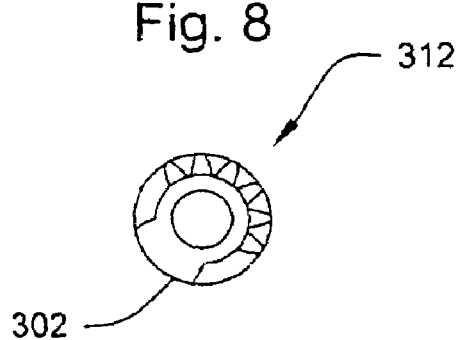
FIG. 8 shows an end view of the section of control rod in FIG. 7A.
Figure 9:
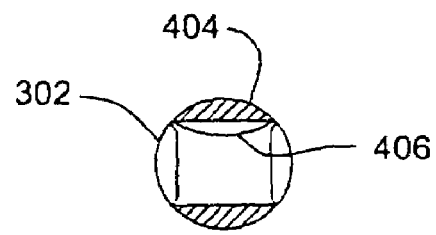
FIG. 9 shows a cross-sectional view of the section of control rod in FIG. 7A taken along line 9-9.

Referring now to FIGS. 7A-7B and FIGS. 4A-4B, shown are top and side elevation views, respectively, of a section 320 of a control rod 302 like the control rod 302 shown in FIGS. 4A-4B. When a section 320 of a control rod 302 is combined with another section 320 of a control rod 302 a complete control rod 302 is formed. Like the control rod 302 shown in FIGS. 4A-4B, each section 320 of a control rod 302 is provided with an annular guide channel 408 for maintaining the section 320 of a control rod 302 in proper alignment with housing 100 and the various ports 108, 110. The annular guide channel 408 can engage a rib portion (not shown) of the control member 304 to prevent lateral movement of the control rod 102. In addition, there is a seal channel 409 disposed on the end of the control rod 302. There can be another seal channel 409 disposed adjacent to the guide channel 408. The seal channels 409 are for receiving a seal such as an o-ring to prevent the leakage of compressed air from the valve housing 102 (FIG. 1). Each section 320 of the control rod 302 also includes at least one sealing face 404 disposed on a portion of the control rod 302. A plurality of ribs 406 can be provided on the each section 320 of the control rod 302 for ensuring greater structural rigidity. There is at least one land 412 opposite each of said at least one sealing face 404. The at least one land 412 is connected to said sealing face 404 by at least one bridge 411 for structural rigidity. The sealing face 404 and plurality of ribs 406 are also shown in FIG. 8, which is a cross-sectional view of the section 320 of the control rod 302, taken along line 9-9.

The invention described and claimed herein is not to be limited in scope by the preferred embodiments herein disclosed, since these embodiments are intended as illustrations of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims.

A number of references are cited herein, the entire disclosures of which are incorporated herein, in their entirety, by reference for all purposes. Further, none of these references, regardless of how characterized above, is admitted as prior art to the invention of the subject matter claimed herein.

We claim:
1. An improved one-way fluid valve construction, comprising:
   a valve housing including at least one valve port and at least one control port, each said valve port and said control port defining a hollow passage extending from an inlet face of said valve housing to an outlet face of said valve housing;
   a control member disposed within said control port, said control member having first and second faces, a first face in fluid communication with said inlet face and a second face in fluid communication with said outlet face, said control member movable within said control port between a first position and a second position;
   a resilient member which biases said control member toward said first position, said control member transitioning from said first position to a second position upon the occurrence of a predetermined fluid pressure differential as between said inlet face and said outlet face;
   a control rod rotatably journaled within said housing and extending between said control member and a portion of said valve port, said control rod having a coupling at a first portion adjacent to said control member, said coupling engaging a portion of said control member and rotating said control rod a predetermined angular amount when said control member transitions between said first position and said second position;
   a sealing face formed on a second portion of said control rod, said sealing face forming a seal with an orifice defined in said hollow passage when said control rod is rotated by said control member to a control rod sealed position, said sealing face unsealing from said orifice when said control rod is rotated by said control member to a control rod unsealed position.

2. The improved valve of claim 1, wherein said at least one valve port is twelve valve ports.

3. The improved valve of claim 1, wherein said at least one control port is three control ports.

4. The improved valve of claim 1, wherein said resilient member is a spring.

5. The improved valve of claim 1, wherein said coupling includes a plurality of gear teeth.

6. The improved valve of claim 1, wherein said control member includes a plurality of gear teeth formed on a shaft of said control member.

7. The improved valve of claim 1, wherein said control rod is formed from at least one section.

8. The improved valve of claim 1, wherein said control rod includes two or more guide channels for maintaining said control rod in proper alignment with said valve housing.

9. The improved valve of claim 1, wherein said control rod includes a plurality of ribs disposed on a portion of said control rod opposed from said sealing face.

10. The improved valve of claim 1, wherein said control rod includes at least one land opposed from said sealing face and at least one bridge extending from said sealing face to said land.

11. A valve and fluid compressor arrangement, comprising:
   a fluid compressor;
   a valve housing having an inlet face and an outlet face;
   at least one valve port disposed in the valve housing defining a flow channel between said inlet face and said outlet face;
   at least one control port disposed in the valve housing defining a cavity between said inlet face and said outlet face;
   a control member disposed within said control port, said control member having first and second faces, a first face in fluid communication with said inlet face and a second face in fluid communication with said outlet face, said control member movable within said control port between a first position and a second position;
   a resilient member which biases said control member toward said first position, said control member transitioning from said first position to a second position upon the occurrence of a predetermined fluid pressure differential as between said inlet face and said outlet face;

a control rod rotatably journaled within said housing and extending between said control member and a portion of said valve port, said control rod having a coupling at a first portion adjacent to said control member, said coupling engaging a portion of said control member and rotating said control rod a predetermined angular amount when said control member transitions between said first position and said second position;

a sealing face formed on a second portion of said control rod, said sealing face forming a seal with an orifice defined in said hollow passage when said control rod is rotated by said control member to a control rod sealed position, said sealing face unsealing from said orifice when said control rod is rotated by said control member to a control rod unsealed position.

12. The arrangement of claim 11, wherein said at least one valve port is twelve valve ports.

13. The arrangement of claim 11, wherein said at least one control port is three control ports.

14. The arrangement of claim 11, wherein said resilient member is a spring.

15. The arrangement of claim 11, wherein said coupling includes a plurality of gear teeth.

16. The arrangement of claim 11, wherein said control member includes a plurality of gear teeth formed on a shaft of said control member.

17. The arrangement of claim 11, wherein said control rod is formed from at least one section.

18. The arrangement of claim 11, wherein said control rod includes two or more guide channels for maintaining said control rod in proper alignment with said valve housing.

19. The arrangement of claim 11, wherein said control rod includes a plurality of ribs disposed on a portion of said control rod opposed from said sealing face.

20. The improved valve of claim 1, wherein said control rod includes at least one land opposed from said sealing face and at least one bridge extending from said sealing face to said land.

21. A valve, comprising:

a valve housing having an inlet face and an outlet face;

at least one valve port defining a flow channel between said inlet face and said outlet face;

at least one control port defining a cavity extending between said inlet face and said outlet face;

a control member disposed within said control port, said control member movable between a first position and a second position within said cavity;

a resilient member biasing said control member toward said first position, said control member being moved from said first position to said second position when a predetermined fluid pressure differential exists across said inlet face and said outlet face, said control member transitioning back to said first position when said predetermined fluid pressure differential across said inlet face and said outlet face no longer exists;

a control rod operably mounted within said valve housing and in operative engagement with said control member, said control rod being moved by said control member back and forth between a control rod sealed position and a control rod unsealed position when said control member transitions between said first and second positions; and a sealing face formed on said control rod, said sealing face forming a seal with an orifice formed in said valve port when said control rod is rotated to said control rod sealed position, said sealing face unsealing from said orifice when said control rod is rotated by said control member to a control rod unsealed position.

22. The arrangement of claim 21, wherein said at least one valve port is twelve valve ports.

23. The arrangement of claim 21, wherein said at least one control port is three control ports.

24. The arrangement of claim 21, wherein said control member includes a first face in fluid communication with said inlet face of said valve housing and a second face in fluid communication with said outlet face of said valve housing.

25. The arrangement of claim 21, wherein said resilient member is a spring.

26. The arrangement of claim 21, wherein said control rod is rotated a predetermined angular amount when said control member transitions between said first position and said second position.

* * * * *